United States Patent [19]

Dewprashad

[11] Patent Number: 5,420,174

[45] Date of Patent: May 30, 1995

[54] METHOD OF PRODUCING COATED PROPPANTS COMPATIBLE WITH OXIDIZING GEL BREAKERS

[75] Inventor: Brahmadeo Dewprashad, Newcastle, Okla.

[73] Assignee: Halliburton Company, Duncan, Okla.

[21] Appl. No.: 970,663

[22] Filed: Nov. 2, 1992

[51] Int. Cl.6 ................................................ C09K 7/00
[52] U.S. Cl. .................................. 523/130; 523/200; 523/208; 523/146; 507/220
[58] Field of Search ........................ 523/130, 200, 208; 252/8.551

[56] References Cited

U.S. PATENT DOCUMENTS

| | | | |
|---|---|---|---|
| 3,026,938 | 3/1962 | Hunt et al. | 166/280 |
| 3,127,345 | 3/1964 | De Groote et al. | 252/8.554 |
| 3,929,191 | 12/1975 | Graham et al. | 166/280 |
| 3,998,271 | 12/1976 | Cooke, Jr. et al. | 166/280 |
| 4,055,528 | 10/1977 | Kim | 523/146 |
| 4,336,842 | 6/1982 | Graham et al. | 166/280 |
| 4,439,489 | 3/1984 | Johnson et al. | 428/404 |
| 4,443,347 | 4/1984 | Underdown et al. | 252/8.551 |
| 4,527,627 | 7/1985 | Graham et al. | 166/280 |
| 4,564,459 | 1/1986 | Underdown et al. | 252/8.551 |
| 4,585,064 | 4/1986 | Graham et al. | 166/280 |
| 4,664,819 | 5/1987 | Glaze et al. | 252/8.551 |
| 4,740,535 | 4/1988 | Iyer et al. | 523/145 |
| 4,741,401 | 5/1988 | Walles et al. | 252/8.551 |
| 4,785,884 | 5/1988 | Armbruster | 166/280 |
| 4,829,100 | 5/1989 | Murphey et al. | 523/131 |
| 4,888,240 | 12/1989 | Graham et al. | 166/280 |
| 5,051,454 | 9/1991 | Lemon et al. | 523/146 |
| 5,165,479 | 11/1992 | Harris et al. | 252/8.551 |

OTHER PUBLICATIONS

Halliburton Services Fracturing Technical Paper, SPE 20640, by L. R. Norman et al, Sep. 23-26, 1990.

*Primary Examiner*—Paul R. Michl
*Assistant Examiner*—Olga Asinovsky
*Attorney, Agent, or Firm*—Robert A. Kent; C. Clark Dougherty, Jr.

[57] ABSTRACT

Methods and compositions are provided for producing a curable resin coated proppant and a crosslinked aqueous gel carrier fluid system. The resin coated proppant and crosslinked aqueous gel carrier fluid system provided may be controllable thinned or "broken" by the addition of a quantity of oxidizing breaker similar to the quantity of oxidizing breaker sufficient to break the carrier fluid in traditional non-resin coated proppant and crosslinked aqueous gel carrier fluid system. A resole resin is the film forming material use to coat the proppant.

12 Claims, No Drawings

METHOD OF PRODUCING COATED PROPPANTS COMPATIBLE WITH OXIDIZING GEL BREAKERS

BACKGROUND OF THE INVENTION

1. Field of the Invention

This invention relates to the treatment of subterranean, hydrocarbon-bearing formations with an improved coated proppant/aqueous gel carrier fluid system. The improved system is particularly useful in the treatment of subterranean formations for purposes of fracturing, gravel pack completions and forming consolidations of particulate material therein.

2. Description of the Prior Art

In the completion and operation of oil wells, gas wells, water wells and similar boreholes, it frequently is desirable to alter the producing characteristics of the formation by treating the well. Many such treatments involve the use of particulate material. For example, in hydraulic fracturing, solid particles, commonly referred to as "proppants" are used to maintain the fracture in an open or propped condition. Also, in sand control techniques, proppants may be placed in the well to prevent the influx or incursion of formation sand or particles.

It is common in the treatment of such formations to coat or encapsulate proppants with natural or synthetic film-forming materials. The coating on the surface of the proppants controls dispersion of particulate fragments or particulate fines. The generation of particulate fines can result from closure pressures exerted by the formation on the proppant. Controlling the migration of particulate fines enhances formation conductivity by preventing free particulate fines from plugging interstitial flow passages therein. While proppants which are characterized as elastic in nature, those which disintegrate upon crushing, benefit most by coating. Coating or encapsulating a proppant generally improves the overall downhole stability of the proppant.

Proppants may be selected from both organic and inorganic materials. Common organic materials include for example, wood chips, nut shells, crushed coke and coal. Inorganic materials include for example crushed rock, sand, and spherical pellets of glass.

Natural or synthetic film-forming materials include natural rubber, elastomers such as butyl rubber, and polyurethane rubber, various starches, petroleum pitch, tar, and asphalt, organic semisolid silicon polymers such as dimethyl and methylphenyl silicones, polyhydrocarbons such as polyethylene, polyproplylene, polyisobutylene, cellulose and nitrocellulose lacquers, vinyl resins such as polyvinylacetate, phenolformaldehyde resins, urea formaldehyde resins, acrylic ester resins such as polymerized esters resins of methyl, ethyl and butyl esters of acrylic and alpha-methylacrylic acids, epoxy resins, melamine resins, drying oils, mineral and petroleum waxes. Methods for coating proppants with such film forming materials include batch mixing and on-the-fly mixing.

Traditionally, carrier fluids, which suspend the coated proppants therein, included salt water or hydrocarbon liquid, such as diesel oil and gelled crude oil. More recently, carrier fluids of the aqueous gelled variety are used. Aqueous gelled carrier fluids include an aqueous gelling agent and a water component.

Aqueous gelling agents include cellulose derivatives and glactomannan derivatives. The popularity of aqueous gelling agents is primarily due to the cost, controllable rheology (crosslinking), environmental compatibility and increased proppant loading capability. Examples of crosslinking agents include aluminum, titanium and boron. Along with the popularity of aqueous gelled carrier fluids, the industry generally recognizes resinous materials and derivatives thereof as the preferred film forming materials.

When an aqueous gel carrier fluid is used to suspend and transport the coated proppant, upon appropriate placement of the coated proppant in the formation the viscosity of the carrier fluid is reduced or "broken" with a viscosity reducing agent or "breaker". The presence of unbroken gel in the formation decreases the conductivity of the proppant bed which can result in decrease productivity of the formation.

Traditional aqueous gelling agent breakers include enzymes and oxidizing breakers. Examples of such oxidizing breakers include ammonium; sodium or potassium persulfate; sodium peroxide; sodium chlorite; sodium, lithium or calcium hypochlorite; chlorinated lime; potassium perphosphate; sodium perborate; magnesium monoperoxyphthalate hexahydrate; and several organic chlorine derivatives such as N,N'-dichlorodimethylhydantion and N-chlorocyanuric acid and/or salts thereof.

At formation temperatures of between about 75° F.–120° F. and a pH range of generally between about 4 to 9, enzyme breakers are suitable. Above formation temperatures of about 140° F. enzyme breakers are inadequate and oxidizing breakers are required. Generally, depending upon the temperature of the gelled carrier fluid, between about 0.5 and 5.0 lbs of oxidizing breaker, such as a persulfate breaker, per 1000 gal of aqueous gel is sufficient to break the carrier fluid in a non-resin coated proppant/aqueous gelled carrier fluid system.

Though resin coated proppants exhibit some compatibility with aqueous gel carrier fluids, when the pH and temperature of the gelled carrier fluid preclude the use of enzyme breakers, it is not uncommon to employ exceedingly high concentrations of oxidizing breakers to reduce the viscosity of these carrier fluids. Generally the concentration of oxidizing breaker required in a resin-coated proppant/aqueous gel system can be as high as 4 to 40 times the amount required for non-coated proppant/aqueous gel system.

Solutions to the oxidizing breaker problem presented by the resin-coated proppant/aqueous gel system have been as straight forward as adding increased amounts of oxidizing breaker to as complex as encapsulating the oxidizing breaker. The first alternative can result in uncontrolled breaks or limited breaking. Uncontrolled breaking can result in a "sand out" of the proppant prior to optimal placement in the target formation. Limited gelled fluid breaking can reduce formation conductivity by leaving unbroken gel in the formation and the proppant bed. Breaker encapsulation, while somewhat more successful than the former method, in many instances also requires the addition of excessive quantities of oxidizing breaker. In addition, the process of encapsulation increases the cost of the breaker. Thus there exists the need for a resin-coated proppant/aqueous gelled carrier fluid system which can be predictably broken with oxidizing breakers and wherein the concentration of the oxidizing breaker is similar to the concentration used in non-coated proppant/aqueous gelled carrier fluid systems.

The inventor has observed that reducing the concentration of free amides (generally primary and secondary amides) and free phenols in the aqueous gel carrier fluid reduces the concentrations of oxidizing breaker required to sufficiently break the aqueous gelled carrier fluid. The inventor has further observed that the aqueous gelled carrier fluid leaches free amides and phenols from certain film forming materials. The inventor has discovered that by using a proppant coating of a resole-type phenolic resin material which does not require hexamethylenetetramine (HEXA) for polymerization, concentrations of free amides in the aqueous gel are reduced. Additionally, as resole-type phenolic resins utilize a phenol prepolymer, the concentrations of free phenol in the carrier fluid are reduced. Thus, by using a resole-type phenolic resin coated proppant, the gelled fluid can be broken without the addition of large concentrations of oxidizing breaker or encapsulated oxidizing breakers

SUMMARY OF THE INVENTION

By the present invention, a method and composition is provided for producing a curable resin coated proppant which when combined with an aqueous gel carrier fluid does not require the addition of excessive quantities of oxidizing breaker to the proppant/carrier fluid system.

The film forming material is a resole-type phenolic resin material and preferably a resole-type phenolic resin material which is polymerized without hexamethylenetetramine and which utilizes a phenol prepolymer and most preferably a resole-type phenolic resin material wherein some replacement of phenolic OH by lower alkylol groups having from between 1-8 carbon atoms, such as for example methylol, has occurred. The preferred film forming resole-type phenolic resin backbone consists of base units having the structural formula:

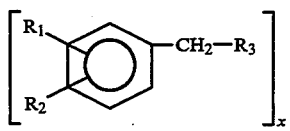

Wherein:
R1 is an OH, or an alkylol group of between 1-8 carbon atoms;
R2 is CH$_2$OH;
R3 is

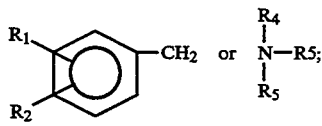

R4 is H or

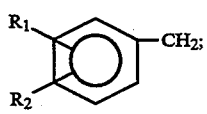

R5 is

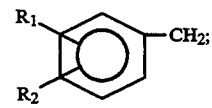

and
x is between 5 and 50.

The preferred molecular wt. of the resole-resin polymer is between about 200 to about 3000 and more perferrably between 1,000 and 1,500.

The preferred proppant material, to which, a coating of resole-type phenolic resin is applied, may be, for example glass beads or commercial grade frac sand. The selection of suitable proppant material will, in large part, depend upon the particular application of the coated proppant. Such selection criteria are well known by those skilled in this art. The resole-type phenolic resin coating may be applied to the proppant material by batch mixing or on-the-fly.

The aqueous gel carrier fluid may be of the cellulose or glactomannan variety and preferably thickened by crosslinking. These carrier fluids are equally applicable for proppant transport for hydraulic fracturing or gravel pack completion purposes. The preferred gel breaker is a persulfate and more preferably sodium persulfate.

DESCRIPTION OF THE PREFERRED EMBODIMENT

The present invention provides for a composition and method for producing a resin-coated proppant/aqueous gelled carrier fluid system wherein the gelled fluid can be broken without the addition of encapsulated oxidizing breakers or large concentrations of non-encapsulated oxidizing breaker. The preferred film-forming material employed in the present invention for coating the proppant is a resole-type phenolic resin (resole resin) and more preferably, a resole resin having a molecular weight of between about 200 and 3000 and most preferably a resole resin having a molecular weight of between about 1,000 and 1,500.

The preferred film forming resole-type phenolic resin backbone consists of base units having the structural formula:

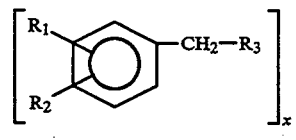

Wherein:
R1 is an OH, or an alkylol group of between 1 and 8 carbon atoms;
R2 is CH$_2$OH;
R3 is

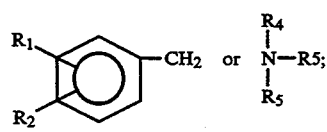

R4 is H or

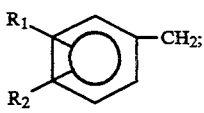

R5 is

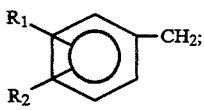

and x is between 5 and 50.

The preferred resole resin is produced by reacting phenols or alkylated derivatives thereof with formaldehyde in the presence of NaOH, NH$_3$ or NH$_4$OH. At molecular weights of between 200 and 3000 the resole resin is substantially insoluble in the aqueous gel carrier fluid at bottom hole temperatures of between 75° F. and 450° F. Resole resins remain soluble in solvents, such as methanol, ethyl acetate, acetone, and acetonitrile. The solubility of resole resin in such solvents, in part, permits the use of this resole resin in batch mixing or on-the-fly coating applications.

Liquid resoles generally polymerize slowly under unrefrigerated conditions. Solid resoles may generally be kept indefinitely and dissolved in a suitable solvent and formulated before use in batching or on-the-fly coating.

Typically, resole resins are one-step resins. In other words, the resole resin self-polymerizes with increasing temperature. More particularly, methylol groups condense with other methylols to produce dibenzyl ethers. The dibenzyl ethers react at the ortho and para position of the phenol to give diphenylmethanes. In the presence of NH$_4$OH or NH$_3$, nitrogen is incorporated into the resin. Nitrogen-incorporated resins generally have higher molecular weights, less free phenol OHs, lower water solubility and higher Tg. than resins catalyzed with NaOH. Hydrogen bonding interaction between the backbone amine units and the phenolic hydroxyls are believed to be the main reason for these properties.

The improved oxidizing breaker compatibility of the resole resins coated proppants/gelled aqueous carrier fluid system of the present invention over traditional novalac-hexa resin coated proppants/gelled aqueous carrier fluid system is believed to be due in part to the absence of HEXA, primary and secondary amides, and lower solubility of the resole resin in the aqueous gelled fluid. It is also believed that lower alkylol substitution of phenolic OHs reduces the concentration of oxidizing breaker required. It is further believed that the leaching of HEXA and novalacs into the aqueous gel and the concentration of phenolic OHs in the novalac-HEXA resin compete with the gel for the breaker. In other words, these solubilized components and phenolic OHs are thought to consume or tie-up available supplies of oxidizing breaker thus requiring the addition of increased quantities of such breakers in view of non-coated proppant/aqueous gel carrier fluid systems.

The proppant material, to which a coating of the resole-type phenolic resin is applied, as previously mentioned, may be glass beads or commercial grade frac sand. The selection of suitable proppant materials generally depends upon the particular application of the coated proppant.

The aqueous gel carrier fluid includes a water component and a gelling agent component. The water component can include water, a sodium chloride and water solution, a potassium chloride and water solution, water-alcohol mixtures and the like.

The gelling agent of the aqueous liquid includes hydratable polymers which contain, in sufficient concentration and reactive position, one or more of the functional groups, such as, hydroxyl, cis-hydroxyl, carboxyl, sulfate, sulfonate, amino or amide. Particularly suitable polymers are polysaccharide and derivatives thereof which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan.

Hydratable synthetic polymers and copolymers which contain the above-mentioned functional groups and which can be utilized in accordance with the present invention include, but are not limited to, polyacrylate, polymethacrylate, polyacrylamide, maleic anhydride methylvinyl ether copolymers, polyvinyl alcohol and polyvinylpyrrolidone.

As previously mentioned, suitable breakers include enzymes and oxidizing breakers. At aqueous gel carrier fluid pHs of greater than about 9 and temperatures greater than about 140° F., oxidizing breakers are required to reduce the viscosity of the crosslinked aqueous gel carrier fluid. The preferred oxidizing breaker is sodium persulfate.

The proppant material can be coated with the resole-resin by batch mixing. In this method, the proppant material is coated by dissolving solid resole resin in a suitable solvent, mixing the resulting solution with the proppant and evaporating the solvent. A hot coating process may also be used. This technique involves preheating the proppant to several hundred degrees Fahrenheit, slowly adding the resole resin to the proppant and mixing the combination until the resole resin melts and coats the proppant. Once coated, the proppant is cooled at which time the resole resin solidifies.

The proppant material can also be coated with the resole-resin on-the-fly, as generally described in U.S. Pat. No. 4,829,100, which is herein incorporated by reference. However, as polymerization of the resole-resin of the present invention is temperature dependent, coating proppants on-the-fly with such resole-resin does not require the addition of hardeners. In this method, a substantially continuous stream of proppant is combined with the aqueous gel carrier liquid, a surface active agent and solubilized resole-resin. Proppant flow is generally in the range of from about 2 to about 20 pounds of proppant per gallon of gelled aqueous carrier liquid. Most preferably, the proppant is present in the mixture in an amount in the range of from about 3 to about 15 pounds per gallon of carrier liquid. Whether batch mix coating or coating on the fly, the preferable ratio of resole-resin to proppant is about 1.00 to about 20 pounds of resole-resin per each 100 pounds of proppant.

In addition, a resin-to-proppant coupling agent is preferably added to the mixture of ingredients and preferably when the mixture of ingredients includes sand as the proppant material. The coupling agent promotes bonding of the resin to the proppant. Suitable coupling agents include functional silane such as N-beta-(aminoethyl)-gamma-aminopropyltrimethozysilane. The resin-to-proppant agent is included in an amount in the range of from about 0.1 to about 2 parts by weight per 100 parts by weight of resole-resin. A commercially available coupling agent is Silane A-1120, a product of Union Carbide, Danbury, Conn.

When employing the resole-resin coated proppant-/aqueous gel carrier fluid system in fracturing operations, a fracture is first generated in the formation. The resole-resin coated proppant/aqueous gel carrier fluid system is then pumped into the fracture. The carrier fluid bleeds off into the formation and deposits the resole-coated proppant in the fracture. After placement of the resole-coated proppant, the well is closed in with the injection pressure being maintained on the formation. As the pressure within the fracture approaches the normal pressure, the fracture walls close on the resole-coated proppant and apply an overburden stress thereto. At the same time, ambient formation temperature heats the resole-resin. Initially, the resin fuses and unites at contact areas with the resin coating of contiguous particles or with the formation walls. As the temperature increases, the polymerization reaction proceeds until the resin is cured to an insoluble, infusible, crosslinked state forming a permeable proppant bed.

In gravel pack applications, the resole-resin coated particles are suspended in the aqueous gelled carrier fluid and the admixture is pumped through tubing and through a crossover tool in the tubing and around the outside of a liner. The aqueous gelled carrier fluid enters the liner and returns to the surface via the crossover tool and the casing-tubing annulus. The resole-resin coated particles screen out on the liner forming a filter bed in the borehole and in surrounding relation to the liner. After placement of sufficient quantities of resole-resin coated particles the tubing and crossover tool are retrieved. Formation temperature cures the resin so as to produce a permeable, fused filter bed surrounding the liner.

In order to further illustrate the methods and compositions of the present invention and facilitate a clear understanding thereof the following examples are given.

EXAMPLE 1

Description of Static Break Test

A linear borate gel was made by admixing the following: 10 gal/Mgal slurry of diesel oil and guar (100 ml diesel and 73.2 g of refined guar with an intermediate residue), 0.2 gal/Mgal of acetic acid, 1 gal Losurf 300, an antifoming surfactant, 1 gal of 25% NaOH/Mgal, Duncan Tap Water and 2 gal/Mgal Clayfix 2, a clay stabilizer and product of Halliburtion Services, Duncan, Okla. The gel was allowed to hydrate overnight. Base gel pH was between 10.86–10.97. Acetic acid and sodium hydroxide were used to control pH of gel.

350 ml portions of the gel were placed in 40 oz jars and 504 g of 20/40 Ottawa Sand which had been coated with ½ gallon/sack of a resin mix of 42 g Durez 11078 (resole resin from Oxy Chemical), 1 ml A1120 (N-beta-(aminoethyl)-gamma-aminopropyltrimethoxysilane, a silane coupling agent from Union Carbide), 1 ml butyl lactate, used as diluent, and 30 ml methanol.

Sodium persulfate (SP) was added to the gel/sand mixture at 5 lb/Mgal and the gel crosslinked by addition of 1.2 gal/Mgal of borate mineral salts and 0.5 lb/Mgal of borax. The gel was then placed in a bath at 75° F. which was brought up to 190° F. at a controlled rate and the viscosity of the gel monitored and measured with a Fann 35 viscometer at 300 rpm using a #1 bob and spring. After 24 hours, the jars were cooled to room temperature and the viscosity and pH of the gel measured.

TABLE I

| Time (hrs) | Temp (°F.) | Vis (cps) |
|---|---|---|
| 1 | 105.3 | c |
| 2 | 135.3 | c |
| 4 | 170 | 15 |
| 6 | 181 | 13 |
| 7 | 186 | 12 |
| 24 | 190 | 11 |
| *24 | — | 27 | c - crosslinked
*viscosity measured at room temperature

In a separate test, 250 g of 20/40 Ottawa Frac Sand was coated with the same resin mix at ½ gallon/sack and packed in the same gel in glass tubes and cured for 20 hrs. at 275° F. The compressive strengths of consolidated resin coated sand were 1714 and 1434 psi at 75° and 275° F. respectively.

EXAMPLE 2

A resole resin mixture was prepared by dissolving 84 grams of Durez 11078 in 80 mls of hot ethanol. Upon cooling to room temperature, 2 mls of the silane coupling agent described above and 4 mls butyl lactate were added. The resin mix was used to coat 2 kgs. or 20/40 Frac sand ant ½ gal/sack. 1 kg. of coated sand was partially cured for 22 minutes at 275° F. The remaining 1 kg. was used without curing. Uncured or partially cured resin coated proppants generally exhibit an adhesive property, such as tackiness or stickiness to the touch and to adjacent contacting resin coated proppants.

Static break tests, using SP as the gel breaker, were done using 300 grams of coated sand, 250 ml gel and 1.2 mls. of 5% K-38. The pH of the gel was 11.2 before the borate crosslinker was added. Additionally, 100 grams of coated sand was slurred in the gel and cured for 20 hrs. at 250° F. and between 350 and 400 psi for compressive strength analysis.

TABLE II

| SP (lb/Mgal) | 5 | 1 |
|---|---|---|
| Resin | Durez 11078 | Durez 11078 (22 min. cure) |
| Viscosity (cps) at | | |
| 1 hr. | c | c |
| 24 hr. | 2 | 2 |
| 24 hr* | 5 | 9 |
| Compressive Strength (psi) | 1205 | 72 |

'c' indicates a crosslinked gel
'*' viscosity at room temperature

Example 2 and Table 2 illustrate that partially cured resole resin coated proppants provided greater SP compatibility, i.e., less SP was required to break the crosslinked gel. Although the partially cured resole resin coated proppant showed a reduction in compressive strength as compared to the cured resole resin coated proppant, the partially cured resole coated proppant remain suitable for fracturing application. This is so because the partially cured resole coating resists crushing and such lower compressive strength are adequate in fracturing application to prevent flow-back under high closure stress. Additionally, these partially cured proppants would consolidate only under high closure stress as in fractures, as opposed to hydrostatic pressures in the wellbore, and would have the advantage of not having to be drilled out of the well bore.

While that which is considered to be the preferred embodiments of the invention has been described herein, it is to be understood that modifications and changes can be made in the methods and compositions without departing from the spirit of scope of the invention as hereinafter set forth in the claims.

What is claimed is:

1. A coated proppant-aqueous gel carrier fluid-oxidizing breaker composition having improved oxidizing breaker compatibility whereby the amount of oxidizing breaker required for breaking the gel carrier fluid is equal to or less than about 5.0 pounds of breaker per 1000 pounds of aqueous gel carrier fluid comprising an admixture of a proppant coated with a resole-type phenolic resin which is polymerized without hexamethylenetetramine and which utilizes a phenol prepolymer, an aqueous gel carrier fluid comprising a water component and a hydratable gelling agent component and an oxidizing breaker present in said admixture in an amount in the range of from about 0.5 to about 5.0 pounds of oxidizing breaker per 1000 pounds of aqueous gel carrier fluid.

2. The composition of claim 1 wherein the oxidizing breaker is sodium persulfate.

3. The composition of claim 1 wherein the aqueous gel fluid is crosslinked by a crosslinking agent.

4. The composition of claim 1 wherein the resole-type phenolic resin comprises a backbone with base units having a structural formula:

$$\left[ \begin{array}{c} R_1 \\ \phantom{X} \\ R_2 \end{array} \!\!\!\!\!\! \bigcirc \!\!\!\!\!\! -CH_2-R_3 \right]_x$$

wherein:
$R_1$ is an OH, or an alkylol group of between 1 and 8 carbon atoms;
$R_2$ is $CH_2OH$;
$R_3$ is

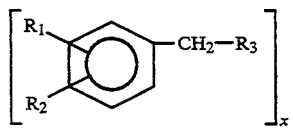

or $\begin{array}{c} R_4 \\ | \\ N-R_5; \\ | \\ R_5 \end{array}$ $R_4$ is H or

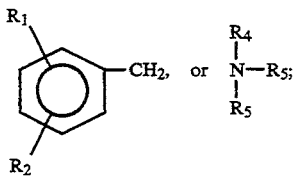

$R_5$ is

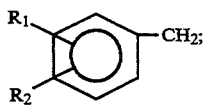

and
x is between 5 and 50.

5. A method of treating a subterranean formation comprising:
admixing a proppant coated with a resole-type phenolic resin which is polymerized without hexamethylenetetramine and which utilizes a phenol prepolymer with an aqueous gel carrier fluid comprising a water component and a hydratable gelling agent component and with an oxidizing breaker in an amount in the range of from about 0.5 to about 5.0 pounds of oxidizing breaker per 1000 pounds of aqueous gel carrier fluid; and
placing the resulting admixture in or adjacent said formation.

6. The method of claims 5 wherein the oxidizing breaker is sodium persulfate.

7. The method of claim 5 wherein the admixture further includes a crosslinking agent.

8. The method of claim 5 wherein the oxidizing breaker is at least one member selected from the group consisting of ammonium; sodium or potassium perfsulfate, sodium peroxide; sodium chlorite; sodium, lithium or calcium hypochlorite; chlorinate lime; potassium perphosphate; sodium perborate; magnesium monoperoxyphthalate hexahydrate; organic chlorine derivatives such a N,N'-dichlorodimethylhydantion and N-chlorocyanuric acid and salts thereof.

9. The method of claim 5 wherein the resole-type phenolic resin includes a backbone comprising base units having a structural formula:

$$\left[ \begin{array}{c} R_1 \\ \phantom{X} \\ R_2 \end{array} \!\!\!\!\!\! \bigcirc \!\!\!\!\!\! -CH_2-R_3 \right]_x$$

wherein:
$R_1$ is an OH, or an alkylol group of between 1 and 8 carbon atoms;
$R_2$ is $CH_2OH$;
$R_3$ is

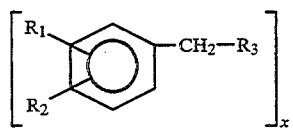

or $\begin{array}{c} R_4 \\ | \\ N-R_5; \\ | \\ R_5 \end{array}$ $R_4$ is H or

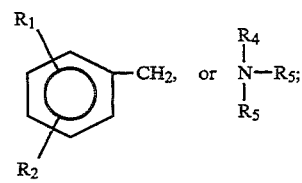

$R_5$ is

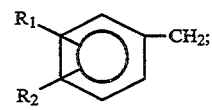

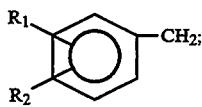

and x is between 5 and 50.

10. A method of treating a subterranean formation comprising:

admixing a proppant coated with a resole-type phenolic resin which is polymerized without hexamethylenetetramine and which utilizes a phenol prepolymer with an aqueous gel carrier fluid comprising a water component, a hydratable gelling agent component and a crosslinking agent component and with an oxidizing breaker in an amount in the range of from about 0.5 to about 5.0 pounds of oxidizing breaker per 1000 pounds of aqueous gel carrier fluid; and placing the resulting admixture in or adjacent said formation.

11. The method of claim 10 wherein the oxidizing breaker is selected from at least on member selected from a group consisting of ammonium; sodium or potassium persulfate; sodium peroxide; sodium chlorite; sodium, lithium or calcium hypochlorite; chlorinated lime; potassium perphosphate; sodium perborate; magnesium monoperoxyphthalate hexahydrate, organic chlorine derivatives such as N,N'-dichlorodimethylhydantion and N-chlorocyanuric acid and salts thereof.

12. The method of claim 10 wherein the resole-type phenolic resin includes a backbone comprising base units having a structural formula:

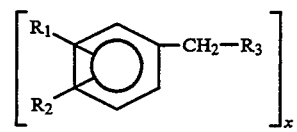

wherein:

$R_1$ is an OH, or an alkylol group of between 1 and 8 carbon atoms;

$R_2$ is $CH_2OH$;

$R_3$ is

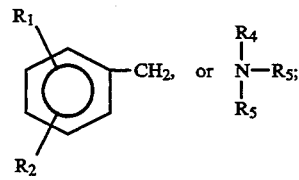

$R_4$ is H or

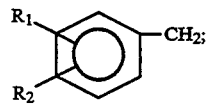

$R_5$ is

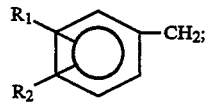

and x is between 5 and 50.

* * * * *